(12) United States Patent
Kozak et al.

(10) Patent No.: US 8,292,989 B2
(45) Date of Patent: Oct. 23, 2012

(54) GAS STREAM PROCESSING

(75) Inventors: Frederic Z. Kozak, Knoxville, TN (US); Arlyn V. Petig, Knoxville, TN (US); Vikram Shabde, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 260 days.

(21) Appl. No.: 12/609,076

(22) Filed: Oct. 30, 2009

(65) Prior Publication Data

US 2011/0100216 A1 May 5, 2011

(51) Int. Cl.
  *B01D 53/14* (2006.01)
(52) U.S. Cl. ............... 95/169; 95/191; 95/199; 95/207; 95/229; 95/236; 96/234; 96/242
(58) Field of Classification Search ............ 95/191, 95/199, 207, 232, 236, 159–160, 168–169; 96/234, 242; 110/215
  See application file for complete search history.

(56) References Cited

U.S. PATENT DOCUMENTS

| | | |
|---|---|---|
| 2,106,734 A | 2/1935 | Gollmar |
| 2,043,109 A | 6/1936 | McKee et al. |
| 2,487,576 A | 11/1949 | Meyers |
| 2,533,992 A | 12/1950 | Brunjes |
| 2,608,461 A | 8/1952 | Frazier |
| 2,878,099 A | 3/1959 | Breuing et al. |
| 3,255,233 A | 6/1966 | Kunze et al. |
| 3,923,955 A | 12/1975 | Fattinger |
| 4,093,544 A | 6/1978 | Ross |
| 4,515,760 A | 5/1985 | Lang et al. |
| 4,847,057 A | 7/1989 | Brugerolle et al. |
| 4,977,745 A | 12/1990 | Heichberger |

(Continued)

FOREIGN PATENT DOCUMENTS

AU 648129 7/1992

(Continued)

OTHER PUBLICATIONS

A.C. Yeh, H. Bai: "Comparison of ammonia and monoethanolamine solvents to reduce CO2 greenhouse gas emissions" The Science of the Total Environment, vol. 338, 1999, pp. 121-133, XP002529608.

(Continued)

*Primary Examiner* — Duane Smith
*Assistant Examiner* — Ives Wu
(74) *Attorney, Agent, or Firm* — Rita D. Vacca

(57) ABSTRACT

A power generation plant (112), a method, and a $CO_2$ capture system (122) for removing carbon dioxide (104) from a flue gas stream (106) are disclosed. As shown in FIG. 2, a $CO_2$ capture system (122), comprises an absorber vessel (202), a water wash vessel (210), and a stripper (214). The $CO_2$ capture system (122) can be configured to introduce both a lean ionic ammonia solution (204) from a regeneration system (124) and a flue gas stream (106) from a cooling system (120) and to provide a rich ionic ammonia solution (206) to a regeneration system (124), wherein the introduction of the lean ionic ammonia solution (204) to the flue gas stream (106) produces a flue gas substantially devoid $CO_2$ (224). The water wash vessel (210) can be configured to receive the flue gas substantially devoid $CO_2$ (224) and produce ammoniated water (212) by introducing water (218) to the flue gas substantially devoid $CO_2$ (224). The stripper (214) can be configured to receive the ammoniated water (212) and to remove ammonia (216) from the ammoniated water (212) thereby producing a cleaned flue gas stream (116), the stripper (214) being operable in at least partial vacuum conditions.

21 Claims, 3 Drawing Sheets

U.S. PATENT DOCUMENTS

| | | | |
|---|---|---|---|
| 4,999,031 A | 3/1991 | Gerhardt et al. | |
| 5,067,972 A | 11/1991 | Hemmings et al. | |
| 5,137,550 A | 8/1992 | Hegarty et al. | |
| 5,186,916 A | 2/1993 | Nevels | |
| 5,318,758 A * | 6/1994 | Fujii et al. | 423/228 |
| 5,378,442 A | 1/1995 | Fujii et al. | |
| 5,403,569 A * | 4/1995 | Abdelmalek | 423/242.7 |
| 5,427,759 A | 6/1995 | Heitmann | |
| 5,453,115 A | 9/1995 | Vuletic | |
| 5,462,583 A | 10/1995 | Wood et al. | |
| 5,599,508 A | 2/1997 | Martinelli et al. | |
| 5,648,053 A | 7/1997 | Mimura et al. | |
| 5,700,311 A | 12/1997 | Spencer | |
| 5,744,037 A * | 4/1998 | Fujimura et al. | 210/620 |
| 5,756,058 A | 5/1998 | Watanabe et al. | |
| 5,832,712 A | 11/1998 | Rønning et al. | |
| 5,853,680 A | 12/1998 | Iijima et al. | |
| 5,979,180 A | 11/1999 | Lebas et al. | |
| 6,027,552 A | 2/2000 | Ruck et al. | |
| 6,210,467 B1 | 4/2001 | Howard | |
| 6,348,088 B2 | 2/2002 | Chung | |
| 6,368,849 B1 * | 4/2002 | Norddahl | 435/262 |
| 6,372,023 B1 | 4/2002 | Kiyono et al. | |
| 6,458,188 B1 | 10/2002 | Mace | |
| 6,485,547 B1 | 11/2002 | Iijima | |
| 6,497,852 B2 | 12/2002 | Chakravarti et al. | |
| 6,506,350 B2 | 1/2003 | Cooper et al. | |
| 6,759,022 B2 | 7/2004 | Hammer et al. | |
| 6,764,530 B2 | 7/2004 | Iijima | |
| 7,022,296 B1 | 4/2006 | Khang et al. | |
| 7,083,662 B2 | 8/2006 | Xu et al. | |
| 7,128,777 B2 | 10/2006 | Spencer | |
| 7,160,456 B2 | 1/2007 | Järventie | |
| 7,255,842 B1 * | 8/2007 | Yeh et al. | 423/234 |
| 7,641,717 B2 * | 1/2010 | Gal | 95/187 |
| 7,846,240 B2 * | 12/2010 | Gal et al. | 95/159 |
| 7,867,322 B2 * | 1/2011 | Gal | 95/199 |
| 7,981,196 B2 * | 7/2011 | Kang et al. | 95/183 |
| 2003/0140786 A1 | 7/2003 | Iijima | |
| 2004/0123736 A1 | 7/2004 | Torres, Jr. et al. | |
| 2004/0126294 A1 | 7/2004 | Cooper et al. | |
| 2005/0169825 A1 | 8/2005 | Cadours et al. | |
| 2006/0178259 A1 | 8/2006 | Schubert et al. | |
| 2006/0204425 A1 | 9/2006 | Kamijo et al. | |
| 2007/0006565 A1 | 1/2007 | Fleischer et al. | |
| 2008/0053909 A1 * | 3/2008 | Fassbender | 210/664 |
| 2008/0072762 A1 | 3/2008 | Gal | |
| 2008/0178733 A1 | 7/2008 | Gal | |
| 2008/0307968 A1 | 12/2008 | Kang et al. | |
| 2009/0101012 A1 | 4/2009 | Gal et al. | |
| 2010/0003177 A1 * | 1/2010 | Aroonwilas et al. | 423/229 |
| 2010/0021362 A1 * | 1/2010 | Hunwick | 423/230 |

FOREIGN PATENT DOCUMENTS

| | | |
|---|---|---|
| AU | 678622 | 6/1995 |
| AU | 693998 | 10/1996 |
| AU | 704708 | 6/1997 |
| AU | 720931 | 2/1998 |
| AU | 733148 | 3/1998 |
| AU | 748293 | 10/2001 |
| AU | 2002300888 | 6/2003 |
| AU | 2002300893 | 6/2003 |
| AU | 2002325051 | 4/2004 |
| AU | 2002348259 | 6/2004 |
| CN | 201 135 851 | 10/2008 |
| DE | 469840 | 12/1928 |
| DE | 2832493 | 7/1978 |
| DE | 3633690 | 4/1988 |
| DE | 10 2004 053167 | 5/2006 |
| EP | 0 202 600 | 11/1986 |
| EP | 0243778 | 11/1987 |
| EP | 0502596 | 9/1992 |
| EP | 0588178 | 3/1994 |
| EP | 1759756 | 3/2007 |
| GB | 271852 | 5/1926 |
| GB | 871207 | 6/1961 |
| GB | 899611 | 6/1962 |
| GB | 2331526 | 5/1999 |
| KR | 100703999 B1 | 3/2007 |
| SU | 512785 | 5/1976 |
| SU | 1567251 | 5/1990 |
| WO | 98/47604 | 10/1998 |
| WO | 02/089958 | 11/2002 |
| WO | 2003/057348 | 7/2003 |
| WO | 2003/089115 | 10/2003 |
| WO | 2003/095071 | 11/2003 |
| WO | 2004/005818 | 1/2004 |
| WO | 2004/030795 | 4/2004 |
| WO | 2004/052511 | 6/2004 |
| WO | 2004/058384 | 7/2004 |
| WO | 2005/087351 | 9/2005 |
| WO | 200602285 | 1/2006 |
| WO | 2006/022885 | 3/2006 |
| WO | 2008/094777 | 8/2008 |
| WO | 2008/101293 | 8/2008 |
| WO | WO 2008/101293 A1 * | 8/2008 |

OTHER PUBLICATIONS

Removal of Carbon Dioxide from Flue Gas by Ammonia Carbonation in the Gas Phase, Xiaonian Li, Edward Hagaman, Costas Tsouris, and James W. Lee, Energy & Fuels 2003, 17, 69-74.

Schussler et al., "Carbon Dioxide Removal from Fossil Fuel Power Plants by Refrigeration Under Pressure", IEEE, 1989.

Resnik et al., "Aqua Ammonia Process for Simultaneous Removal of CO2, SO2 and NOx," Int. J. Environmental Tech. And Management, May 31, 2004 (approx.), pp. 89-104, vol. 4, Nos. 1/2.

Andrea Corti et al., "Reduction of Carbon Dioxide emissions from a SCGT/CC by Ammonia Solution Absorption Preliinary Results" International Journal of Thermodynamics, International Centre for Applied Thermodynamics, Istanbul, TR, vol. 7, No. 4, Dec. 1, 2004, pp. 173-181.

PCT International Search Report and the Written Opinion of the International Searching Authority, dated Jun. 4, 2010—(PCT/US2010/022710).

* cited by examiner

GAS STREAM PROCESSING

FIELD

This technology relates to systems and methods for removing carbon dioxide from gas streams including carbon dioxide and sulfur dioxide.

BACKGROUND

In the combustion of a fuel, such as coal, oil, peat, waste, etc., in a combustion plant, such as those associated with boiler systems for providing steam to a power plant, a process gas or flue gas is generated. Such a flue gas will often contain, among other things, carbon dioxide ($CO_2$) and sulfur dioxide ($SO_2$). The negative environmental effects of releasing carbon dioxide to the atmosphere have been widely recognized, and have resulted in the development of processes adapted for removing carbon dioxide from the hot process gas generated in the combustion of the above mentioned fuels.

Known systems include chilled ammonia based systems. Chilled ammonia based systems can capture and/or remove $CO_2$ from a gas stream. For example, absorption of $CO_2$ from a gas stream can be achieved by contacting a chilled ionic ammonia solution (or slurry) with a flue gas stream that contains $CO_2$. These systems can include strippers for removing ammonia from water and returning the water to the process. The strippers operate at predetermined temperatures. The operating temperature affects energy efficiency.

What is needed is a method and system permitting the reduction of the operational temperature for strippers in gas stream processing.

SUMMARY

According to aspects illustrated herein, there is provided a $CO_2$ capture system for removing carbon dioxide from a flue gas stream, the $CO_2$ capture system comprising an absorber vessel configured to introduce both a lean ionic ammonia solution from a regeneration system and the flue gas stream from a cooling system and configured to provide a rich ionic ammonia solution to the regeneration system, wherein the introduction of the lean ionic ammonia solution and the flue gas stream reacts to produce a flue gas substantially devoid of $CO_2$. A water wash vessel is configured to receive flue gas from the absorber and produce ammoniated water. A stripper is configured to receive the ammoniated water and is configured to remove ammonia from the ammoniated water thereby producing a cleaned flue gas stream, the stripper being operable in at least partial vacuum conditions.

According to other aspects illustrated herein, there is provided a power generation plant, comprising a $CO_2$ capture system for removing carbon dioxide from a flue gas stream, the $CO_2$ capture system comprising an absorber vessel configured to introduce a lean ionic ammonia solution from a regeneration system and the flue gas stream from a cooling system. The ammonia solution and the flue gas react in the absorber vessel. The absorber vessel is further configured to discharge a rich ionic ammonia solution to the regeneration system, wherein the interaction of the lean ionic ammonia solution with the flue gas stream produces an absorber flue gas stream substantially devoid of $CO_2$. A water wash vessel is configured to receive the absorber flue gas. It introduces water, mixing the two, producing ammoniated water. A stripper is configured to receive the ammoniated water and remove ammonia from the ammoniated water, thereby producing a cleaned flue gas stream, the stripper being operable in at least partial vacuum conditions. The cooling system reduces the temperature of the flue gas stream, then provides the flue gas stream to the $CO_2$ capture system, and then receives the cleaned flue gas stream from the $CO_2$ capture system after $CO_2$ removal. The regeneration system is configured to receive the rich ionic ammonia solution from the $CO_2$ capture system, remove ammonia, and provide the lean ionic ammonia solution to the $CO_2$ capture system, wherein the lean ionic ammonia solution is an absorbent ionic ammonia solution. The absorbent ionic ammonia solution is an aqueous solution comprising water, ammonium ions, bicarbonate ions, carbonate ions, and carbamate ions, and wherein heat for operating the stripper is provided by a reject water stream from a power plant, the reject water stream being provided at a temperature of about 90° F.

According to other aspects illustrated herein, there is provided a method for removing carbon dioxide from flue gas streams, comprising in an absorber vessel, reacting a lean ionic ammonia solution from a regeneration system and a flue gas stream from a cooling system. A rich ionic ammonia solution resulting from the reaction in the absorber vessel is provided to the regeneration system. The introduction of the lean ionic ammonia solution to the flue gas stream in the absorber vessel produces an absorber flue gas stream substantially devoid of $CO_2$. The absorber flue gas is introduced in the water wash vessel and intermixed with water thereby producing ammoniated water. Discharged water may be returned to the water wash vessel or otherwise recycled. The ammoniated water is then transported from the water wash vessel to a stripper, where ammonia is removed from the ammoniated water thereby producing a cleaned flue gas stream, the stripper being operable in at least partial vacuum conditions.

The above described and other features are exemplified by the following figures and detailed description.

BRIEF DESCRIPTION OF THE DRAWINGS

Referring now to the figures, which are exemplary embodiments, and wherein the like elements are numbered alike.

DETAILED DESCRIPTION

A method and system permitting the reduction of the operational temperature for strippers and the removal of carbon dioxide in gas stream processing is provided.

Figure 1:
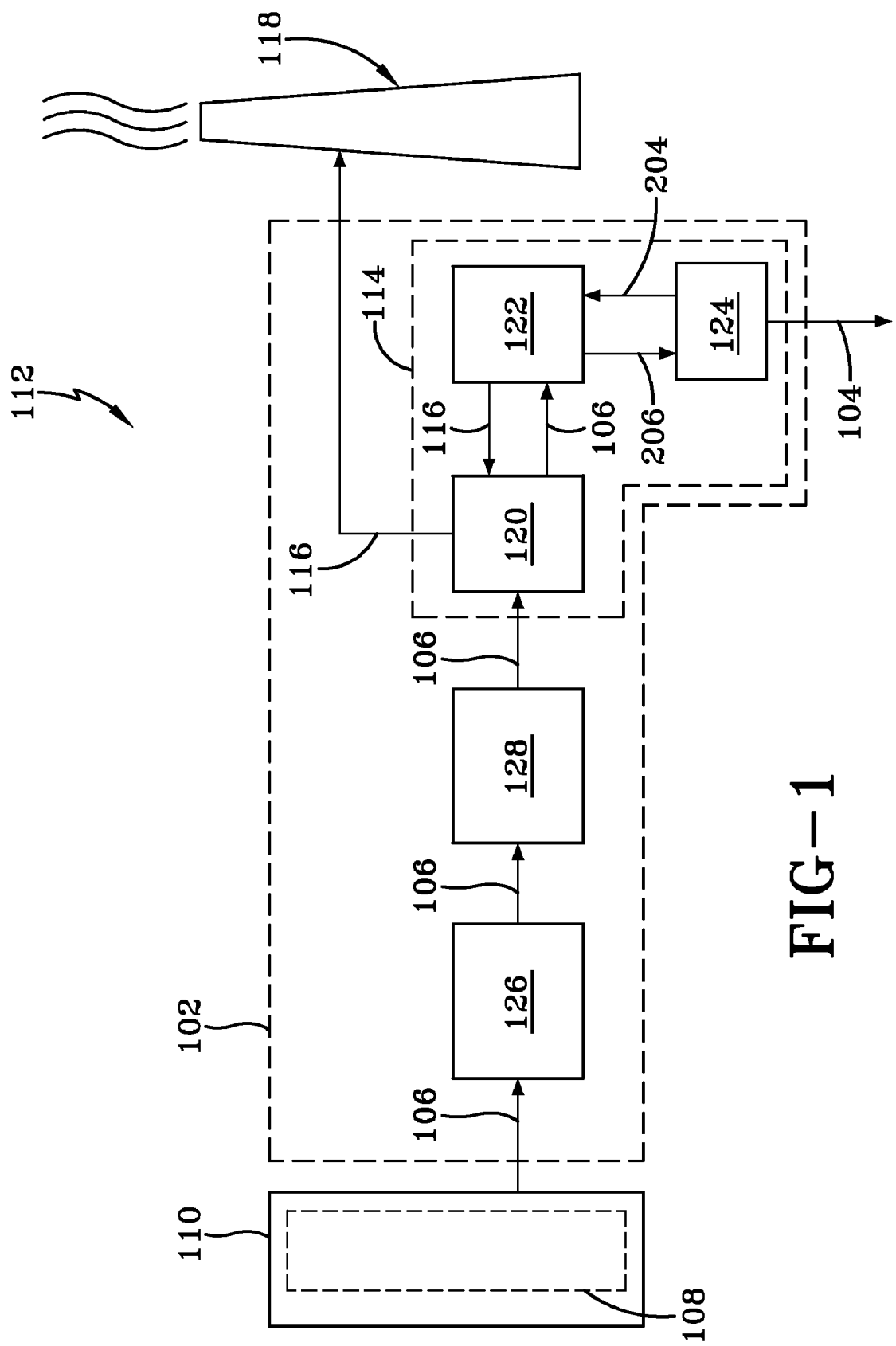
FIG. 1 is a schematic representation of a power generation plant including a system for removing $CO_2$ from a flue gas stream.

Referring to FIG. 1, a flue gas processing system 102 can remove pollutants (for example, $CO_2$ 104) from a flue gas stream 106 emitted by a combustion chamber 108 of a boiler system 110. System 102 can be used in a power generation plant 112. System 102 can include a $CO_2$ removal system 114 configured to remove $CO_2$ from flue gas stream 106 prior to emitting a cleaned flue gas stream 116 (for example, to an exhaust stack 118 or for additional processing). $CO_2$ removal system 114 can transport $CO_2$ removed from flue gas stream 106 for storage, collection, or other use. $CO_2$ removal system 114 can include a cooling system 120 for cooling flue gas stream 106 entering an additional cooling system (not shown), a $CO_2$ capture system 122 for capturing/removing $CO_2$ from flue gas stream 106, and/or a regeneration system 124 for regenerating an ionic ammonia solution used to remove $CO_2$ from flue gas stream 106. Cooling system 120 can be any suitable cooling system configured to provide flue gas stream 106 to $CO_2$ capture system 122 and receive a cleaned flue gas stream 116 from $CO_2$ capture system 122.

In an exemplary embodiment, system 102 may further include a dust removal system 126. Dust removal system 126 can receive flue gas stream 106 emitted by combustion chamber 108. Dust removal system 126 can remove dust, ash, and other particulate matter from flue gas stream 106 prior to flue gas stream 106 being processed by $CO_2$ removal system 114. In further exemplary embodiments, system 102 may further include suitable processing systems. For example, system 102 may include a scrubber 128 configured to further process flue gas stream 106 prior to flue gas stream 106 being processed by $CO_2$ removal system 114.

Figure 2:
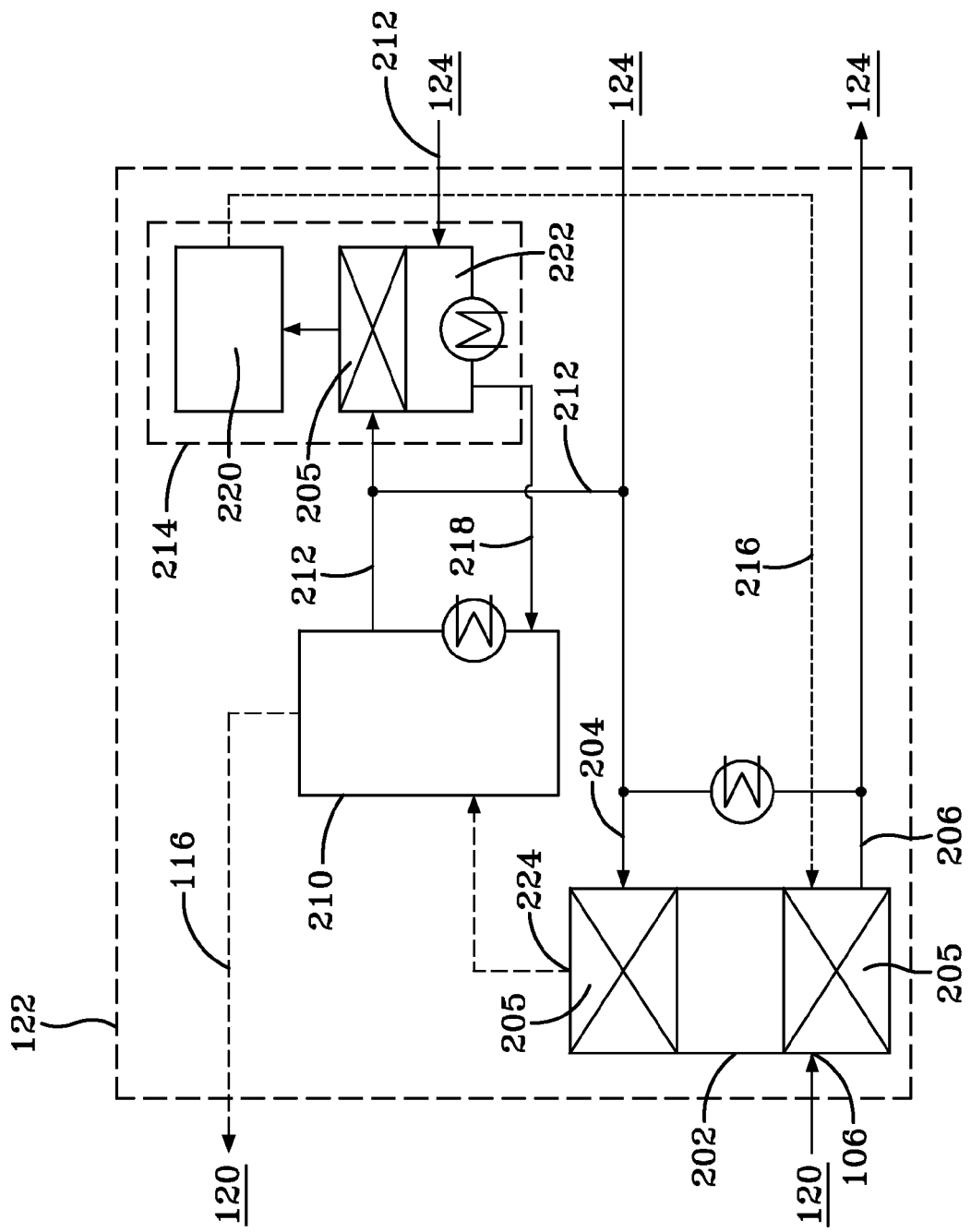
FIG. 2 is a schematic representation of a $CO_2$ capture system in a system for removing $CO_2$ from a flue gas stream.

Referring to FIG. 2, $CO_2$ capture system 122 can include an absorber vessel 202 configured to apply an absorbent ionic ammonia solution (for example, a lean ionic ammonia solution 204) from regeneration system 124 to flue gas stream 106 coming from cooling system 120. For example, the absorbent ionic ammonia solution from regeneration system 124 can be co-mixed with flue gas stream 106 input coming from cooling system 120. The absorbent ionic ammonia solution can be aqueous and can include water and ammonium ions, bicarbonate ions, carbonate ions, and/or carbamate ions. Regeneration system 124 can be any suitable system configured to receive a rich ionic ammonia solution 206 from $CO_2$ capture system 122 and provide lean ionic ammonia solution 204 to $CO_2$ capture system 122. As used herein, the phrase "rich ionic ammonia solution" refers to ionic ammonia solution having an increased concentration of $CO_2$. For example, in one embodiment, the rich ionic ammonia solution 206 includes a ratio of ammonia:$CO_2$, which may be from about 1.5:1 to about 1.9:1. As used herein, the phrase "lean ionic ammonia solution" refers to ionic ammonia solution having a decreased concentration of $CO_2$ as compared to the rich ionic ammonia solution. For example, in one embodiment, the lean ionic ammonia solution 204 includes a ratio of ammonia:$CO_2$, which may be from about 2.3:1 to about 3.5:1.

Absorber vessel 202 can receive the lean ionic ammonia solution 204 from regeneration system 124. A liquid distribution system (not shown) can introduce lean ionic ammonia solution 204 into absorber vessel 202 while flue gas stream 106 is being received by absorber vessel 202.

A gas-liquid contacting device 205 (for example, a mass transfer device) can introduce absorbent ionic ammonia solution 204 into device 205 to contact and/or co-mix solution 204 with flue gas stream 106. The gas-liquid contacting device 205 can be a predetermined structure and/or random packing materials. For example, the gas-liquid contacting device 205 can include valve trays, sieve trays, structured packing, random packing or other suitable packing materials, or a combination thereof. Device 205 increases surface area of ionic ammonia solution 204, thereby increasing gas-liquid interface. The gas-liquid contacting device 205 can be located in absorber vessel 202 and within a path of flue gas stream 106.

Lean ionic ammonia solution 204 can absorb $CO_2$ from flue gas stream 106, thus increasing the concentration of $CO_2$ in a solution derived from lean ionic ammonia solution 204 being contacted and/or co-mixed with flue gas stream 106. This solution derived from lean ionic ammonia solution 204 can be rich ionic ammonia solution 206. Rich ionic ammonia solution 206 can flow toward gas-liquid contacting device 205 and then be collected. For example, solution 206 can be collected in absorber vessel 202.

Rich ionic ammonia solution 206 can then flow to regeneration system 124. In regeneration system 124, rich ionic ammonia solution 206 can release $CO_2$ absorbed by lean ionic ammonia solution 204. The released $CO_2$ can be collected and/or transported for storage and/or use. Upon releasing $CO_2$, the resulting ionic ammonia solution has a lower concentration of $CO_2$ and thereby can be recycled as lean ionic ammonia solution 204. The recycled lean ionic ammonia solution 204 can be reused to absorb $CO_2$ from flue gas stream 106 or an additional flue gas stream.

The flue gas stream 106 containing ammonia leaving absorber vessel 202 after interaction with lean ionic ammonia solution 204 can be directed to water wash vessel 210 where it interacts with water. Water wash vessel 210 can remove ammonia 216 that may be present in flue gas substantially devoid $CO_2$ 224 thereby producing ammoniated water 212. Additionally or alternatively, ammoniated water 212 may be provided by regeneration system 124. Thus, the source of ammoniated water 212 may be water wash vessel 210, lean ionic ammonia solution 204, regeneration system 124, or combinations thereof. Ammoniated water 212 can be directed to stripper 214. Stripper 214 can remove ammonia 216 from ammoniated water 212 and return water 218 back to water wash vessel 210. Ammonia 216 removed from water wash vessel 210 can be returned to absorber vessel 202.

Stripper 214 can operate at a predetermined temperature. Generally, the predetermined temperature is a boiling point of water at a given operating pressure. Decreasing the boiling point of water can improve efficiency of stripper 214 by decreasing the predetermined temperature. Such a reduction in the predetermined temperature permits additional sources of heat to be effective. For example, in a power plant, the predetermined temperature may be about 90° F. when the source is at a pressure of about 0.70 pounds-force per square inch absolute ("psia"). Thus, in the power plant, a reject water stream having a temperature of about 90° F. can be the source of heat for operating stripper 214 when pressure is correspondingly reduced.

Referring again to FIG. 2, in an exemplary embodiment of system 102, stripper 214 can be heated by any suitable source with a lower temperature under lower pressure. Stripper 214 can be part of $CO_2$ capture system 122 within $CO_2$ removal system 114. Stripper 214 can include a stripper vessel 222 and a vacuum pump 220. Stripper vessel 222 can be any suitable vessel (for example, a generally cylindrically-shaped vessel (for example, a steel vessel) configured to operate within a predetermined pressure range). Stripper vessel 222 can include one or more suitable gas-liquid contacting devices 205 (for example, a mass transfer device) as described above. Stripper vessel 222 can include a heater (not shown) for providing temperature control of liquid collected in stripper vessel 222. For example, the heater can heat the liquid collected in the bottom of stripper vessel 222. Vacuum pump 220 can generate at least partial vacuum conditions for stripper vessel 222. The at least partial vacuum conditions can be generated by a vacuum pump (not shown) or steam jet injector. Thus, stripper 214 can be operated as a vacuum stripper. Operating the vacuum stripper under at least partial vacuum conditions can permit use of a water source within lower temperature ranges. The at least partial vacuum conditions are known and can be found in available steam tables. As stripper 214 approaches full evacuation, the source used can be of a lower temperature. Thus, the desired amount of heat for stripper 214 can be reduced by increased evacuation. In exemplary embodiments, the at least partial vacuum conditions of stripper 214 include a pressure of less than about 10 psia. In other exemplary embodiments, the at least partial vacuum conditions of stripper 214 include a pressure of less than about 1 psia.

Figure 3:
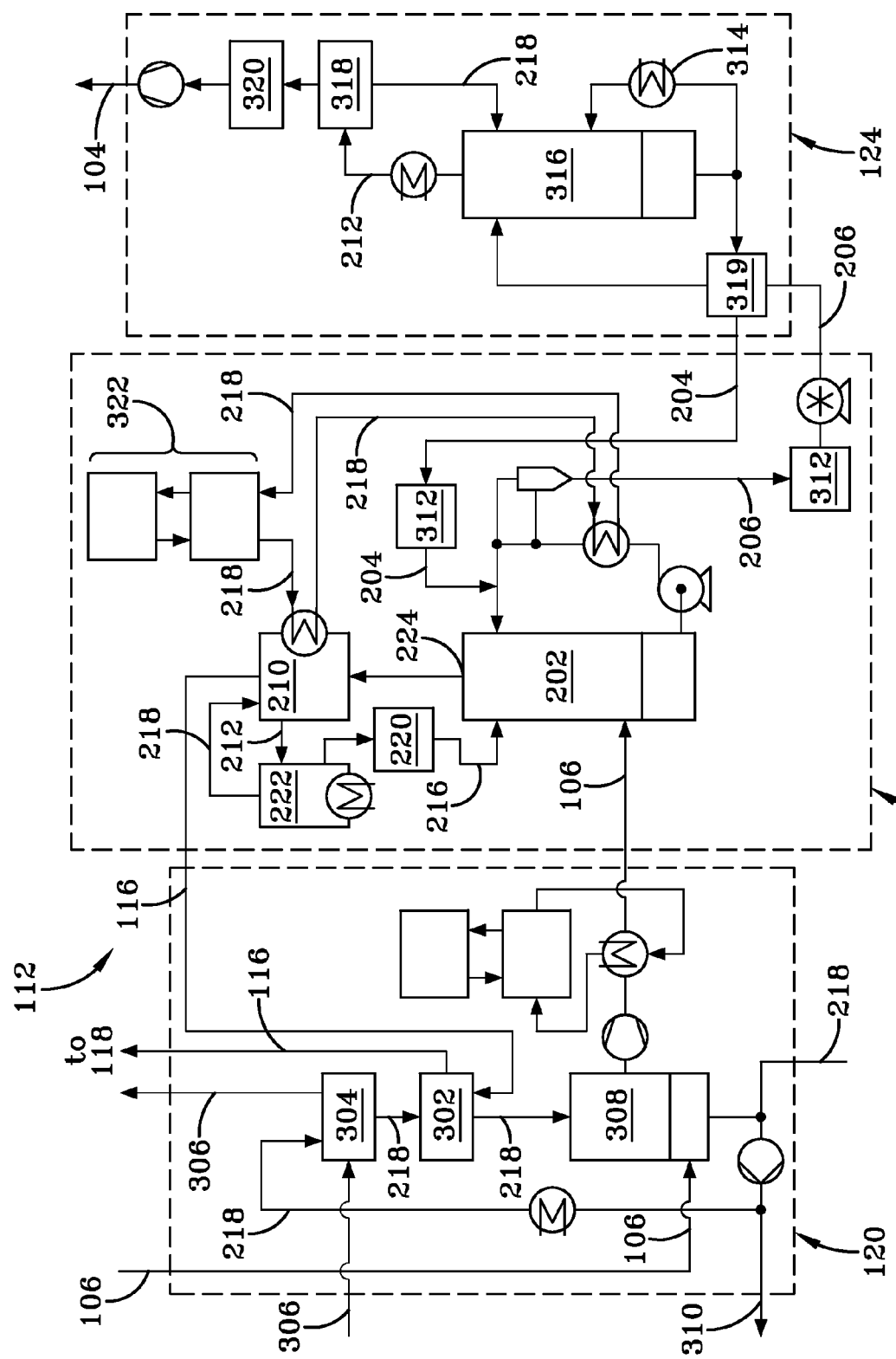
FIG. 3 is a schematic representation of a $CO_2$ removal system including a cooling system, a $CO_2$ capture system, and a regeneration system.

FIG. 3 shows a further exemplary embodiment of power generation plant 112 including cooling system 120, $CO_2$ capture system 122, and regeneration system 124. In the embodiment, cooling system 120 can include a first vessel 302 configured to cool cleaned flue gas stream 116 prior to cleaned flue gas stream 116 being sent to exhaust stack 118. First vessel 302 can receive water 218 from a water source. Heat from the gas stream is exchanged with the water and water is sent to a cooling tower 304. In an open system, water is circulated through the cooling tower, some of which evaporates, the remainder being returned to the first vessel and supplemented with water from the water source, such as a river, lake, or stream. In a closed loop system, water is circulated through the cooling tower and is returned to the first vessel. Cooling tower 304 can be any suitable cooling mechanism. In one embodiment, cooling tower 304 receives air 306 and cools heated water 218 prior to air 306 being released into the atmosphere, into another process, or stored. In one embodiment, second vessel 308 may receive flue gas stream 106 from another system (for example, boiler system 110). Second vessel 308 is configured to provide ammonia scrubbing of $SO_2$ by reacting flue gas stream 106 with chilled water 218 from first vessel 302 to form ammonium sulfate. A portion of the flue gas stream 106 can then form a bleed 310, which may be used in another process or stored. The remaining portion of flue gas stream 106 can flow to $CO_2$ capture system 122.

The exemplary embodiment of $CO_2$ capture system 122 in FIG. 3 can include features identified above with reference to FIG. 2. In addition, $CO_2$ capture system 122 can include one or more buffer tanks 312 for providing flow control and/or a volume for storage of lean ionic ammonia solution 204 and/or rich ionic ammonia solution 206. Additionally or alternatively, $CO_2$ capture system 122 can include cooling tower 304 and chiller arrangement 322 for cooling water 218 to be used in water wash vessel 210. As will be appreciated, additional heat exchangers, pumps, flow control devices, and other process control systems/apparatus may be included for further regulating the flow of flue gas stream 106, lean ionic ammonia solution 204, rich ionic ammonia solution 206, water 218, ammoniated water 212, ammonia 216, flue gas substantially devoid of $CO_2$ 224, or other suitable process fluids.

Regeneration system 124 can receive rich ionic ammonia solution 206 from $CO_2$ capture system 122. Regeneration system 124 can include a heat exchanger 314 for transferring heat from lean ionic ammonia solution 204 directed toward $CO_2$ capture system 122 to rich ionic ammonia solution 206 heading toward a main column 316 of regeneration system 124. Regeneration system 124 can further include a direct contact cooler 318 and a treatment system 320 for purifying $CO_2$ 104 prior to its release, storage, or use.

Operation of an embodiment including the vacuum stripper 222 according to the embodiments disclosed herein can increase energy efficiency by permitting use of a source to drive the vacuum stripper within lower temperature ranges. Such operation can clean gas being emitted by industrial processes. Additionally or alternatively, such operation can permit sequestration of $CO_2$ to be more efficient.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A $CO_2$ capture system for removing carbon dioxide from a flue gas stream, the $CO_2$ capture system comprising:
   an absorber vessel configured to introduce both a lean ionic ammonia solution from a regeneration system and the flue gas stream from a cooling system, wherein the lean ionic ammonia solution interacts with the flue gas stream to provide a rich ionic ammonia solution to the regeneration system, wherein the introduction of the lean ionic ammonia solution to the flue gas stream further produces a flue gas substantially devoid of $CO_2$;
   a water wash vessel configured to receive the flue gas substantially devoid of $CO_2$ and produce ammoniated water by introducing water to the flue gas substantially devoid of $CO_2$; and
   a stripper configured to receive the ammoniated water and configured to remove ammonia from the ammoniated water, the stripper being operable in at least partial vacuum conditions;
   the cooling system configured to cool and provide the flue gas stream to the $CO_2$ capture system and configured to receive a cleaned flue gas stream from the $CO_2$ capture system
   wherein the $CO_2$ capture system produces the cleaned flue gas stream.

2. The $CO_2$ capture system of claim 1, wherein the at least partial vacuum conditions include a pressure of less than about 1 psia.

3. The $CO_2$ capture system of claim 1, wherein the lean ionic ammonia solution includes a ratio of ammonia to $CO_2$ from about 2.3:1 to about 3.5:1.

4. The $CO_2$ capture system of claim 1, wherein the rich ionic ammonia solution includes a ratio of ammonia to $CO_2$ from about 1.5:1 to about 1.9:1.

5. The $CO_2$ capture system of claim 1, further comprising the regeneration system configured to receive the rich ionic ammonia solution from the $CO_2$ capture system and provide the lean ionic ammonia solution to the $CO_2$ capture system while removing $CO_2$.

6. The $CO_2$ capture system of claim 1, wherein the $CO_2$ capture system is part of a power generation plant.

7. The $CO_2$ capture system of claim 6, wherein the power generation plant further comprises a boiler system having a combustion chamber.

8. The $CO_2$ capture system of claim 1, wherein the lean ionic ammonia solution is an aqueous solution further comprising water, ammonium ions, bicarbonate ions, carbonate ions, and carbamate ions.

9. The $CO_2$ capture system of claim 1, further comprising a gas-liquid contacting device configured to contact the lean ionic ammonia solution with the flue gas stream.

10. The $CO_2$ capture system of claim 9, wherein the gas-liquid contacting device includes a first gas-liquid contacting device having a predetermined structure and a second gas-liquid contacting device having a random structure.

11. A power generation plant, comprising:
   a $CO_2$ capture system for removing carbon dioxide from a flue gas stream, the $CO_2$ capture system comprising:
   an absorber vessel configured to introduce a lean ionic ammonia solution from a regeneration system and the flue gas stream from a cooling system, wherein the lean ionic ammonia solution interacts with the flue gas stream to provide a rich ionic ammonia solution to the regeneration system, wherein the introduction of the lean ionic ammonia solution to the flue gas stream further produces a flue gas substantially devoid of $CO_2$;

a water wash vessel configured to receive the flue gas substantially devoid of $CO_2$ and water thereby producing ammoniated water; and a stripper configured to receive the ammoniated water and remove ammonia from the ammoniated water, the stripper being operable in at least partial vacuum conditions;

wherein the $CO_2$ capture system produces a cleaned flue gas stream;

the cooling system configured to provide the flue gas stream to the $CO_2$ capture system after reducing the temperature of the flue gas stream and configured to receive the cleaned flue gas stream from the $CO_2$ capture system; and the regeneration system configured to receive the rich ionic ammonia solution from the $CO_2$ capture system and provide the lean ionic ammonia solution to the $CO_2$ capture system; and, wherein the lean ionic ammonia solution is an absorbent ionic ammonia solution, the absorbent ionic ammonia solution being an aqueous solution comprising water, ammonium ions, bicarbonate ions, carbonate ions, and carbamate ions, and wherein heat for operating the stripper is provided by a reject water stream from a power generation plant, the reject water stream being provided at a temperature of about 90° F.

12. The $CO_2$ capture system of claim 11, wherein the lean ionic ammonia solution includes a ratio of ammonia to $CO_2$ from about 2.3:1 to about 3.5:1 and the rich ionic ammonia solution includes a ratio of ammonia to $CO_2$ from about 1.5:1 to about 1.9:1.

13. A method for removing carbon dioxide from flue gas streams, comprising:

interacting a lean ionic ammonia solution from a regeneration system and a flue gas stream from a cooling system in an absorber vessel;

providing a rich ionic ammonia solution resulting from the interaction in the absorber vessel to the regeneration system, wherein the introduction of the lean ionic ammonia solution to the flue gas stream in the absorber vessel further produces a flue gas substantially devoid $CO_2$;

introducing the flue gas substantially devoid $CO_2$ to water in a water wash vessel thereby producing ammoniated water;

providing ammoniated water from the water wash vessel to a stripper; and removing ammonia from the ammoniated water in the stripper, the stripper operating in at least partial vacuum conditions;

the cooling system configured to provide the flue gas stream to the $CO_2$ capture system after reducing the temperature of the flue gas stream and configured to receive the cleaned flue gas stream from the $CO_2$ capture system; and;

wherein the method produces a cleaned flue gas stream.

14. The method of claim 13, wherein the at least partial vacuum conditions include a pressure of less than about 1 psia.

15. The method of claim 13, wherein the lean ionic ammonia solution includes a ratio of ammonia to $CO_2$ from about 2.3:1 to about 3.5:1 and the rich ionic ammonia solution includes a ratio of ammonia to $CO_2$ from about 1.5:1 to about 1.9:1.

16. The $CO_2$ capture system of claim 1, wherein the at least partial vacuum conditions include a pressure of less than about 10 psia.

17. The method of claim 13, wherein the at least partial vacuum conditions include a pressure of less than about 10 psia.

18. A $CO_2$ capture system for removing carbon dioxide from a flue gas stream, the $CO_2$ capture system comprising:

an absorber vessel configured to introduce both a lean ionic ammonia solution from a regeneration system and the flue gas stream from a cooling system, wherein the lean ionic ammonia solution interacts with the flue gas stream to provide a rich ionic ammonia solution to the regeneration system, wherein the introduction of the lean ionic ammonia solution to the flue gas stream further produces a flue gas substantially devoid of $CO_2$;

a water wash vessel configured to receive the flue gas substantially devoid of $CO_2$ and produce ammoniated water by introducing water to the flue gas substantially devoid of $CO_2$; and a stripper configured to receive the ammoniated water and configured to remove ammonia from the ammoniated water, the stripper being operable in at least partial vacuum and wherein heat is provided to the stripper by a reject water stream from a power generation plant;

the cooling system configured to cool and provide the flue gas stream to the $CO_2$ capture system and configured to receive a cleaned flue gas stream from the $CO_2$ capture system;

wherein the $CO_2$ capture system produces the cleaned flue gas stream.

19. The $CO_2$ capture system of claim 18, wherein the reject water stream from the power generation plant has a temperature of about 90° F.

20. A method for removing carbon dioxide from flue gas streams, comprising:

interacting a lean ionic ammonia solution from a regeneration system and a flue gas stream from a cooling system in an absorber vessel;

providing a rich ionic ammonia solution resulting from the interaction in the absorber vessel to the regeneration system, wherein the introduction of the lean ionic ammonia solution to the flue gas stream in the absorber vessel further produces a flue gas substantially devoid $CO_2$;

introducing the flue gas substantially devoid $CO_2$ to water in a water wash vessel thereby producing ammoniated water;

providing ammoniated water from the water wash vessel to a stripper; and removing ammonia from the ammoniated water in the stripper, the stripper operating in at least partial vacuum conditions of less than about 10 psia;

the cooling system configured to provide the flue gas stream to the $CO_2$ capture system after reducing the temperature of the flue gas stream and configured to receive the cleaned flue gas stream from the $CO_2$ capture system; and;

wherein the method produces a cleaned flue gas stream.

21. The method of claim 20, wherein the reject water stream has a temperature of about 90° F.

* * * * *